(12) United States Patent
Bastiaens et al.

(10) Patent No.: US 6,353,050 B1
(45) Date of Patent: Mar. 5, 2002

(54) THERMOPLASTIC BLEND COMPRISING POLY(ARYLENE ETHER) AND POLYAMIDE

(75) Inventors: Jozef H. P. Bastiaens, Bergen op Zoom (NL); Bret Ja Chisholm, Clifton Park, NY (US); Christiaan Henricus Koevoets, Roosendaal (NL); Lennea T. Petersson, Saltsjo-Duvnas (SE)

(73) Assignee: General Electric Co., Pittsfield, MA (US)

(*) Notice: Subject to any disclaimer, the term of this patent is extended or adjusted under 35 U.S.C. 154(b) by 0 days.

(21) Appl. No.: 09/687,581

(22) Filed: Oct. 13, 2000

(51) Int. Cl.⁷ ................................................ C08L 51/00
(52) U.S. Cl. .................. 524/538; 525/397; 525/434
(58) Field of Search ......................... 524/538; 525/397, 525/434

(56) References Cited

U.S. PATENT DOCUMENTS

| | | |
|---|---|---|
| 2,071,250 A | 2/1937 | Carothers |
| 2,071,251 A | 2/1937 | Carothers |
| 2,130,523 A | 9/1938 | Carothers |
| 2,130,948 A | 9/1938 | Carothers |
| 2,241,322 A | 5/1941 | Hanford |
| 2,312,966 A | 3/1943 | Hanford |
| 2,465,319 A | 3/1949 | Whinfield |
| 2,512,606 A | 6/1950 | Bolton et al. |
| 3,018,272 A | 1/1962 | Griffing |
| 3,047,539 A | 7/1962 | Pengilly |
| 3,078,254 A | 2/1963 | Zelinski et al. |
| 3,265,765 A | 8/1966 | Holden et al. |
| 3,297,793 A | 1/1967 | Dollinger |
| 3,379,792 A | 4/1968 | Finholt |
| 3,402,159 A | 9/1968 | Hsieh |
| 3,428,699 A | 2/1969 | Schelmer et al. |
| 3,546,008 A | 12/1970 | Shields, et al. |
| 3,594,452 A | 7/1971 | De La Mare et al. |
| 3,756,999 A | 9/1973 | Stetter et al. |
| 3,822,227 A | 7/1974 | Hermann et al. |
| 3,876,721 A | 4/1975 | Yasui et al. |
| 4,054,612 A | 10/1977 | Yagi et al. |
| 4,315,086 A | 2/1982 | Ueno et al. |
| 4,565,684 A | 1/1986 | Tibbetts et al. |
| 4,572,813 A | 2/1986 | Arakawa |
| 4,600,741 A | 7/1986 | Aycock et al. |
| 4,642,358 A | 2/1987 | Aycock et al. |
| 4,663,230 A | 5/1987 | Tennent |
| 4,816,289 A | 3/1989 | Komatsu et al. |
| 4,826,933 A | 5/1989 | Grant et al. |
| 4,866,114 A | 9/1989 | Taubitz et al. |
| 4,876,078 A | 10/1989 | Arakawa et al. |
| 4,927,894 A | 5/1990 | Brown |
| 4,980,424 A | 12/1990 | Sivavec |
| 5,024,818 A | 6/1991 | Tibbetts et al. |
| 5,041,504 A | 8/1991 | Brown et al. |
| 5,115,042 A | 5/1992 | Khouri et al. |
| 5,165,909 A | 11/1992 | Tennent et al. |
| 5,300,572 A | 4/1994 | Tajima et al. |
| 5,589,152 A | 12/1996 | Tennent et al. |
| 5,591,382 A | 1/1997 | Nahass et al. |

FOREIGN PATENT DOCUMENTS

GB 1264741 2/1972

OTHER PUBLICATIONS

"Polymer Alloys, Blends, and Ionomers" by L.A. Utracki, D.J. Walsh, & R.A. Weiss 1989 American Chemical Society—31 pages.

*Primary Examiner*—Edward J. Cain

(57) ABSTRACT

A thermoplastic composition comprising a poly(arylene ether), a polyamide, a compatibilizing agent, and a polyester ionomer exhibits reduced moisture absorption and improved paint adhesion. Use of the polyester ionomer allows use of lower amounts of conductive fillers.

32 Claims, No Drawings

THERMOPLASTIC BLEND COMPRISING POLY(ARYLENE ETHER) AND POLYAMIDE

BACKGROUND OF THE INVENTION

The present invention relates to a thermoplastic blend. In particular, the invention relates to a thermoplastic blend comprising a poly(arylene ether) and a polyamide and having reduced water absorption.

Thermoplastic blends comprising poly(arylene ether)s and polyamides are commercially available materials that combine the heat resistance, stiffness and impact strength of the amorphous poly(arylene ether) phase with the chemical resistance and processability of the crystalline polyamide phase. Their exceptional balance of thermal and mechanical properties has led to adoption of these blends by the automotive industry for use in painted body panels. A disadvantage of known blends of poly(arylene ether)s and polyamides is the absorption of water by the polyamide phase. Variations in the water content of these resin blends are associated with variations in thermal properties and in dimensional stability that can sometimes make a part unsuitable for its intended use. There is also a desire to improve the suitability of blends for use in painted parts. Specifically, formulations with improved paint adhesion and reduced levels of expensive conductive fillers are desired.

There therefore remains a need for poly(arylene ether)/polyamide blends with reduced water absorption and improved paint adhesion.

BRIEF SUMMARY OF THE INVENTION

A poly(arylene ether)/polyamide blend having reduced water absorption comprises:

about 5 to about 95 weight percent of a poly(arylene ether);

about 5 to about 95 weight percent of a polyamide;

about 0.01 to about 10 weight percent of a compatibilizing agent; and about 0.1 to about 20 weight percent of a polyester ionomer which is the polycondensation product of (1) an aromatic dicarboxylic acid or its ester-forming derivative; (2) a diol compound or its ester-forming derivative; and (3) an ester-forming compound containing an ionic sulfonate group;

wherein weight percentages are based on the total weight of the composition.

DETAILED DESCRIPTION OF THE PREFERRED EMBODIMENTS

Thermoplastic blends exhibiting reduced water absorption, improved paint adhesion, and improved conductivity comprise:

about 5 to about 95 weight percent of a poly(arylene ether);

about 5 to about 95 weight percent of a polyamide;

about 0.01 to about 10 weight percent of a compatibilizing agent; and about 0.1 to about 20 weight percent of a polyester ionomer which is the polycondensation product of (1) an aromatic dicarboxylic acid or its ester-forming derivative; (2) a diol compound or its ester-forming derivative; and (3) an ester-forming compound containing an ionic sulfonate group;

wherein weight percentages are based on the total weight of the composition.

The composition may comprise any conventional poly(arylene ether). The term poly(arylene ether) includes polyphenylene ether (PPE) and poly(arylene ether) copolymers; graft copolymers; poly(arylene ether) ether ionomers; and block copolymers of alkenyl aromatic compounds, vinyl aromatic compounds, and poly(arylene ether), and the like; and combinations comprising at least one of the foregoing; and the like. Poly(arylene ether)s per se, are known polymers comprising a plurality of structural units of the formula:

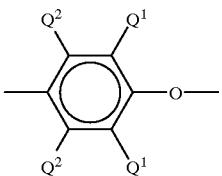

wherein for each structural unit, each $Q^1$ is independently halogen, primary or secondary lower alkyl having 1 to about 7 carbon atoms, phenyl, haloalkyl, aminoalkyl, hydrocarbonoxy, or halohydrocarbonoxy wherein at least two carbon atoms separate the halogen and oxygen atoms; and each $Q^2$ is independently hydrogen, halogen, primary or secondary lower alkyl, phenyl, haloalkyl, hydrocarbonoxy or halohydrocarbonoxy as defined for $Q^1$. Preferably, each $Q^1$ is alkyl or phenyl, especially $C_{1-4}$ alkyl, and each $Q^2$ is hydrogen.

Both homopolymer and copolymer poly(arylene ether)s are included. The preferred homopolymers are those containing 2,6-dimethylphenylene ether units. Suitable copolymers include random copolymers containing, for example, such units in combination with 2,3,6-trimethyl-1,4-phenylene ether units or copolymers derived from copolymerization of 2,6-dimethylphenol with 2,3,6-trimethylphenol. Also included are poly(arylene ether)s containing moieties prepared by grafting vinyl monomers or polymers such as polystyrenes, as well as coupled poly(arylene ether) in which coupling agents such as low molecular weight polycarbonates, quinones, heterocycles and formals undergo reaction in known manner with the hydroxy groups of two poly(arylene ether) chains to produce a higher molecular weight polymer. Poly(arylene ether)s of the present invention further include combinations of any of the above.

The poly(arylene ether) generally has a number average molecular weight within the range of about 3,000 to about 40,000 and a weight average molecular weight within the range of about 20,000 to about 80,000, as determined by gel permeation chromatography. The poly(arylene ether) generally has an intrinsic viscosity of about 0.10 to about 0.60 deciliters per gram (dl/g), preferably in the range of about 0.29 to about 0.48 dl/g, all as measured in chloroform at 25° C. It is also possible to utilize a high intrinsic viscosity poly(arylene ether) and a low intrinsic viscosity poly(arylene ether) in combination. Determining an exact ratio, when two intrinsic viscosities are used, will depend somewhat on the exact intrinsic viscosities of the poly(arylene ether) used and the ultimate physical properties desired.

The poly(arylene ether)s are typically prepared by the oxidative coupling of at least one monohydroxyaromatic compound such as 2,6-xylenol or 2,3,6-trimethylphenol. Catalyst systems are generally employed for such coupling; they typically contain at least one heavy metal compound such as a copper, manganese or cobalt compound, usually in combination with various other materials.

Particularly useful poly(arylene ether)s for many purposes are those that comprise molecules having at least one aminoalkyl-containing end group. The aminoalkyl radical is typically located in an ortho position to the hydroxy group. Products containing such end groups may be obtained by incorporating an appropriate primary or secondary monoamine such as di-n-butylamine or dimethylamine as one of the constituents of the oxidative coupling reaction mixture. Also frequently present are 4-hydroxybiphenylend groups, typically obtained from reaction mixtures in which a by-product diphenoquinone is present, especially in a copper-halide-secondary or tertiary amine system. A substantial proportion of the polymer molecules, typically constituting as much as about 90% by weight of the polymer, may contain at least one of said aminoalkyl-containing and 4-hydroxybiphenyl end groups.

It will be apparent to those skilled in the art from the foregoing that suitable poly(arylene ether)s include all those presently known, irrespective of variations in structural units or ancillary chemical features.

The composition may comprise poly(arylene ether) in an amount of about 5 to about 95 weight percent, based on the total weight of the composition. It is preferred to use the poly(arylene ether) in an amount of about 20 to about 60 weight percent, more preferably about 30 to about 45 weight percent.

Suitable polyamide resins are a generic family of resins known as nylons, characterized by the presence of an amide group (—C(O)NH—). Nylon-6 and nylon-6,6 are the generally preferred polyamides and are available from a variety of commercial sources. Other polyamides, however, such as nylon-4,6, nylon-12, nylon-6,10, nylon-6,9, nylon-6/6T and nylon-6,6/6T with triamine contents below about 0.5 weight percent, as well as others, such as the amorphous nylons may be useful for particular poly(arylene ether)-polyamide applications. Mixtures of various polyamides, as well as various polyamide copolymers, are also useful. A highly preferred polyamide is nylon-6,6.

The polyamides can be obtained by a number of well known processes such as those described in U.S. Pat. Nos. 2,071,250; 2,071,251; 2,130,523; 2,130,948; 2,241,322; 2,312,966; and 2,512,606. Nylon-6, for example, is a polymerization product of caprolactam. Nylon-6,6 is a condensation product of adipic acid and 1,6-diaminohexane. Likewise, nylon-4,6 is a condensation product of adipic acid and 1,4-diaminobutane. Besides adipic acid, other useful diacids for the preparation of nylons include azelaic acid, sebacic acid, dodecane diacid, as well as terephthalic and isophthalic acids, and the like. Other useful diamines include m-xylyene diamine, di-(4-aminophenyl)methane, di-(4-aminocyclohexyl)methane, 2,2-di-(4-aminophenyl)propane, 2,2-di-(4-aminocyclohexyl)propane, among others. Copolymers of caprolactam with diacids and diamines are also useful.

Polyamides having viscosity of up to about 400 milliliters per gram (ml/g) can be used, with a viscosity of about 90 to about 350 ml/g preferred, and about 110 to about 240 ml/g especially preferred, as measured in a 0.5 weight percent solution in 96 weight percent sulfuric acid in accordance with ISO 307.

The composition may comprise polyamide in an amount of about 5 to about 95 weight percent, based on the total weight of the composition. It is preferred to use the polyamide in an amount of about 30 to about 70 weight percent, more preferably about 40 to about 60 weight percent.

The composition may further comprise a compatibilizing agent. Compatibilizing agents generally improve the physical properties of the poly(arylene ether)-polyamide resin blend, and they enable the use of a greater proportion of the polyamide component. When used herein, the expression "compatibilizing agent" refers to those polyfunctional compounds that interact with either the poly(arylene ether), the polyamide resin, or both. This interaction may be chemical (e.g., grafting) or physical (e.g., affecting the surface characteristics of the dispersed phases). In either instance the resulting poly(arylene ether)-polyamide composition appears to exhibit improved compatibility, particularly as evidenced by enhanced impact strength, mold knit line strength and/or elongation. As used herein, the expression "compatibilized poly(arylene ether)-polyamide base resin" refers to those compositions that have been physically or chemically compatibilized with an agent as discussed above, as well as those compositions that are physically compatible without such agents, as described in, for example, U.S. Pat. No. 3,379,792.

Examples of the various non-polymeric compatibilizing agents that may be employed include: a) liquid diene polymers, b) epoxy compounds, c) oxidized polyolefin waxes, d) quinones, e) organosilane compounds, f) polyfunctional compounds, and g) functionalized poly(arylene ether)s obtained by reacting one or more of the previously mentioned compatibilizing agents with poly(arylene ether)s as described below.

Suitable liquid diene polymers (a) include homopolymers of a conjugated diene, as well as copolymers of a conjugated diene with at least one monomer selected from other conjugated dienes; vinyl monomers such as styrene and alpha-methyl styrene; olefins such as ethylene, propylene, butene-1, isobutylene, hexene-1, octene-1 and dodecene-1, and mixtures thereof. The liquid diene polymer preferably have a number average molecular weight of about 150 to about 10,000 preferably about 150 to about 5,000. These homopolymers and copolymers can be produced by the methods described in, for example, U.S. Pat. Nos. 4,054,612; 3,876,721; and 3,428,699 and include, among others, polybutadiene, polyisoprene, poly(1,3-pentadiene), poly(butadiene-isoprene), poly(styrene-butadiene), polychloroprene, poly(butadiene-alpha methylstyrene), poly(butadiene-styrene-isoprene), poly(butylene-butadiene), and the like.

Epoxy compounds (b) suitable for use include: (1) epoxy resins produced by condensing polyhydric phenols (e.g. bisphenol A, tetrabromobisphenol A, resorcinol and hydroquinone) and epichlorohydrin; (2) epoxy resins produced by condensing polyhydric alcohols (e.g., ethylene glycol, propylene glycol, butylene glycol, polyethylene glycol, polypropylene glycol, pentaerythritol, trimethylolethane, and the like) and epichlorohydrin; (3) glycidyletherified products of monohydric alcohols and monohydric phenols, including phenyl glycidylether, butyl glycidyl ether, and cresyl glycidylether; (4) glycidyl derivatives of amino compounds, including the diglycidyl derivatives of aniline; and (5) epoxidized products of higher olefins, cycloalkenes, natural unsaturated oils (e.g. soybean oil), and the foregoing liquid diene polymers; and the like.

Oxidized polyolefin waxes (c) are well known and an illustrative description thereof and processes for their production are found in U.S. Pat. Nos. 3,822,227 and 3,756,999. Generally, these are prepared by an oxidation or suspension oxidation of polyolefin. An especially preferred polyolefin wax is "Hoechst Wachs".

Suitable quinone compounds (d) are characterized as having in the molecule of the unsubstituted derivative at least one six-membered carbon ring; at least two carbonyl groups in the ring structure, both of which may be in the same or, if more than one ring, different rings, provided that they occupy positions corresponding to the 1,2- or 1,4-orientation of the monocyclic quinone; and at least two carbon-carbon double bonds in the ring structure, said carbon-carbon double bonds and carbonyl carbon-oxygen double bonds being conjugated with respect to each other. Where more than one ring is present in the unsubstituted quinone, the rings may be fused, non-fused, or both: non-fused rings may be bound by a direct carbon-carbon double bond or by a hydrocarbon radical having conjugated unsaturation such as —C=C—C=C—.

Substituted quinones are also within the scope of the present invention. The degree of substitution, where substitution is desired, may be from one to the maximum number of replaceable hydrogen atoms. Exemplary of the various substituents that may be present on the quinone nucleus include halogen (e.g. chlorine, bromine, and fluorine), hydrocarbon radicals including branched and unbranched, saturated and unsaturated alkyl, aryl, alkylaryl and cycloalkyl radicals and halogenated derivatives thereof; and similar hydrocarbons having heteroatoms therein, particularly oxygen, sulfur, or phosphorus, and wherein the heteroatom connects the radical to the quinone ring.

Exemplary quinones include 1,2- and 1,4-benzoquinone; 2,6-diphenyl-1,4-benzoquinone; 3,3',5,5'-tetramethyl-4,4'-diphenoquinone; 2,2'- and 4,4'-diphenoquinone; 1,2-, 1,4-, and 2,6-naphthoquinone; 2,3,5,6-tetrachloro-2,5-cyclohexadiene-1,4-dione (chloranil); 2-chloro-1,4-benzoquinone; 2,6-dimethyl benzoquinone; and the like.

Organosilane compounds (e) suitable as compatibilizing agents are characterized as having in the molecule (1) at least one silicon atom bonded to a carbon through an oxygen link and (2) at least one carbon-carbon double bond or carbon-carbon triple bond and/or a functional group selected from an amine group or a mercapto group provided that the functional group is not directly bonded to the silicon atom.

In such compounds, the C—O—Si component is generally present as an alkoxy or acetoxy group bonded directly to the silicon atom, wherein the alkoxy or acetoxy group generally has fewer than about 15 carbon atoms and may also contain hetero atoms (e.g., oxygen). Additionally, there may also be more than one silicon atom in the compound, such multiple silicon atoms, if present, being linked through an oxygen atom (e.g., siloxanes), a silicon-silicon bond, or a divalent organic radical (e.g., methylene or phenylene), or the like.

Examples of suitable organosilane compounds include gamma-aminopropyltriethoxy silane, 2-(3-cyclohexyl) ethyltrimethoxy silane, 1,3-divinyltetraethoxy silane, vinyl tris-(2-methoxyethoxy)silane, 5-bicycloheptenyl triethoxy silane, and gamma-mercaptopropyl trimethoxy silane.

Polyfunctional compounds (f) that may be employed as compatibilizer are of three types. The first type includes molecules having both a carbon-carbon double bond or a carbon-carbon triple bond and at least one carboxylic acid, anhydride, amide, ester, imide, amino, epoxy, orthoester, or hydroxy group. Examples of such polyfunctional compounds include maleic acid; maleic anhydride; fumaric acid; glycidyl acrylate; itaconic acid; aconitic acid; maleimide; maleic hydrazide; products resulting from the reaction of a diamine with maleic anhydride, maleic acid, fumaric acid, or the like; dichloromaleic anhydride; maleic acid amide; unsaturated dicarboxylic acids (e.g., acrylic acid, butenoic acid, methacrylic acid, pentenoic acid, decenoic acids, undecenoic acids, dodecenoic acids, linoleic acid, and the like); esters, acid amides or anhydrides of the foregoing unsaturated carboxylic acids; unsaturated alcohols (e.g., crotyl alcohol, methyl vinyl carbinol, 4-pentene-1-ol, 1,4-hexadiene-3-ol, 3-butene-1,4-diol, 2,5-dimethyl-3-hexene-2,5-diol and alcohols of the formulae $C_nH_{2n-1}OH$, $C_nH_{2n-3}OH$, $C_nH_{2n-5}OH$, $C_nH_{2n-7}OH$, and $C_nH_{2n-9}OH$, wherein n is a positive integer not greater than about 30); unsaturated amines resulting from replacing the —OH group(s) of the above unsaturated alcohols with —NH$_2$ groups; functionalized diene polymers and copolymers; and the like. Of these, maleic acid, fumaric acid, and maleic anhydride are preferred.

The second group of polyfunctional compatibilizer compounds suitable for use herein are characterized as having both a group represented by the formula (OG) wherein G is hydrogen or an alkyl, aryl, acyl or carbonyl dioxy group, and at least two groups, each of which may be the same or different, selected from carboxylic acid, acid halide, anhydride, acid halide anhydride, ester, orthoester, amide, imido, amino, and various salts thereof. Typical examples of this group include aliphatic polycarboxylic acids, acid esters and acid amides represented by the formula:

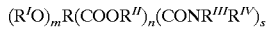

wherein R is a linear or branched chain, saturated aliphatic hydrocarbon of from 2 to 20, preferably 2 to 10, carbon atoms; $R^I$ is hydrogen or an alkyl, aryl, acyl or carbonyl dioxy group of 1 to 10, preferably 1 to 6, most preferably 1 to 4, carbon atoms; each $R^{II}$ is independently hydrogen or an alkyl or aryl group having from 1 to about 20 carbon atoms, preferably from 1 to about 10 carbon atoms; each $R^{III}$ and $R^{IV}$ are independently hydrogen or an alkyl or aryl group having from 1 to about 10, preferably from 1 to about 6, more preferably 1 to about 4, carbon atoms; m is equal to 1; (n+s) is greater than or equal to 2, preferably equal to 2 or 3, and n and s are each greater than or equal to zero; and $(OR^I)$ is alpha or beta to a carbonyl group and at least two carbonyl groups are separated by 2 to 6 carbon atoms. $R^I$, $R^{II}$, $R^{III}$ and $R^{IV}$ cannot be aryl when the respective substituent has less than 6 carbon atoms.

Exemplary members of this second group include citric acid, malic acid, agaricic acid, and the like, including the various commercial forms thereof, such as for example, the anhydrous and hydrated acids. Illustrative of useful esters include, for example, acetyl citrate and mono- and/or distearyl citrates, and the like. Suitable amides include, for example, N,N-diethyl citric acid amide; N-phenyl citric acid amide; N-dodecyl citric acid amide; N,N-didodecyl citric acid amide and N-dodecyl malic acid. Especially preferred derivates are the salts thereof, including the salts with amines and preferably, the alkali and alkaline earth metal salts. Exemplary salts include calcium malate, calcium citrate, potassium malate, and potassium citrate.

The third group of polyfunctional compatibilizer compounds are characterized as having in the molecule both (1) an acid halide group, most, preferably an acid chloride group, and (2) at least one carboxylic acid, anhydride, ester, epoxy, orthoester, or amide group, preferably a carboxylic acid or anhydride group. Examples of compatibilizers within this group include trimellitic anhydride acid chloride, chloroformyl succinic anhydride, chloroformyl succinic acid, chloroformyl glutaric anhydride, chloroformyl glutaric acid, chloroacetyl succinic anhydride, chloroacetylsuccinic acid, trimellitic acid chloride, and chloroacetyl glutaric acid. Among these, trimellitic anhydride acid chloride is preferred. Furthermore, it is especially preferred that compatibilizers of this group be pre-reacted with at least a portion of the poly(arylene ether) whereby the compatibilizing agent is a poly(arylene ether)-functionalized compound.

The foregoing compatibilizing agents are more fully described in U.S. Pat. Nos. 4,315,086; 4,600,741; 4,642,358; 4,826,933; 4,927,894; 4,980,424; 5,041,504; and 5,115,042.

The foregoing compatibilizing agents may be used alone or in various combinations. Furthermore, they may be added directly to the melt blend or pre-reacted with either or both the poly(arylene ether) and polyamide, as well as with other resinous materials. With many of the foregoing compatibilizing agents, particularly the polyfunctional compounds, even greater improvement in compatibility is found where at least a portion of the compatibilizing agent is pre-reacted, either in the melt or in a solution of a suitable solvent, with all or a part of the poly(arylene ether). It is believed that such pre-reacting may cause the compatibilizing agent to react with the polymer and, consequently, functionalize the poly(arylene ether). For example, the poly(arylene ether) may be pre-reacted with maleic anhydride to form an anhydride functionalized poly(arylene ether) that has improved compatibility with the polyamide compared to a non-functionalized poly(arylene ether).

Where the compatibilizing agent is employed, the amount used will depend on the specific compatibilizing agent chosen and the specific polymeric system to which it is added. Such amounts may be readily determined by one of ordinary skill in the art. In the preferred embodiment in which the compatibilizing agent is maleic acid, maleic anhydride, citric acid, or fumaric acid, a suitable amount is about 0.01 to about 10 weight percent, preferably about 0.1 to about 3 weight percent, more preferably about 0.3 to about 1.5 weight percent, based on the weight of the entire composition.

It is possible to use in the composition according to the invention any other known compatibilization system. Other systems have been described, for example, in U.S. Pat. No. 4,866,114.

The term polyester ionomer as used herein refers to the polycondensation reaction product of an aromatic dicarboxylic acid or its ester-forming derivative, a diol or its ester-forming derivative, and an ester-forming compound comprising an ionic sulfonate group.

The polyester ionomer may comprise a monovalent and/or divalent aryl carboxylic sulfonate salt units represented by the formula:

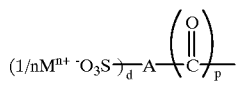

wherein p=1–3; d=1–3; p+d=2–6; M is a metal; n=1–5; and A is an aryl group containing one or more aromatic rings, for example, benzene, naphthalene, anthracene, biphenyl, terphenyl, oxy diphenyl, sulfonyl diphenyl, or alkyl diphenyl, where the sulfonate substituent is directly attached to an aryl ring. These groups are incorporated into the polyester through carboxylic ester linkages. The aryl groups may contain one or more sulfonate substituents (d=1–3) and may have one or more carboxylic acid linkages (p=1–3). Groups with one sulfonate substituent (d=1) and two carboxylic linkages (p=2) are preferred.

Preferred metals are alkali or alkaline earth metals where n=1–2. Zinc and tin are also preferred metals.

The polyester ionomer may alternatively comprise sulfonate salt units represented by the formula:

$$(1/nM^{n+} \ ^-O_3S)_d—A—(OR''OH)_p$$

wherein p, d, M, n, and A are as defined above, and wherein R' is a divalent alkylene or alkyleneoxy group, for example,

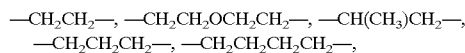

and the like.

A preferred polyester ionomer comprises divalent ionomer units represented by the formula:

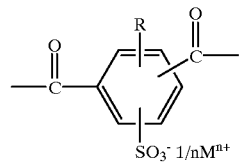

wherein R is hydrogen, halogen, alkyl having from one to about twenty carbons, or aryl having from one to about twenty carbons; M is a metal, and n=1–5.

Typical sulfonate substituents that can be incorporated into the metal sulfonate polyester copolymer may be derived from the following carboxylic acids or their ester forming derivatives: sodium 5-sulfoisophthalic acid, potassium sulfoterephthalic acid, sodium sulfonaphthalene dicarboxylic acid, calcium 5-sulfoisophthalate, potassium 4,4'-di(carbomethoxy) biphenyl sulfonate, lithium 3,5-di(carbomethoxy)benzene sulfonate, sodium p-carbomethoxybenzenesulfonate, dipotassium 5-carbomethoxy-1,3-disulfonate, sodio 4-sulfonaphthalene-2,7-dicarboxylic acid, 4-lithio sulfophenyl-3,5-dicarboxy benzene sulfonate, 6-sodiosulfo-2-naphthyl-3,5-dicarbomethoxy benzene sulfonate, and dimethyl 5-[4-(sodiosulfo)phenoxy]isophthalate.

Other suitable sulfonate carboxylic acids and their ester forming derivatives are described in U.S. Pat. Nos. 3,018,272 and 3,546,008 which are included herein by reference. Preferred sulfonate polyesters include those derived from sodium 3,5-dicarbomethoxybenzene sulfonate

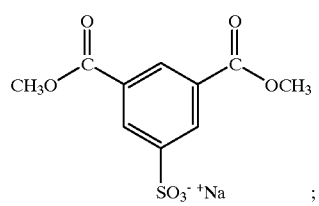

the bis(ethylene glycol) ester of sodium 5-sulfoisophthalate

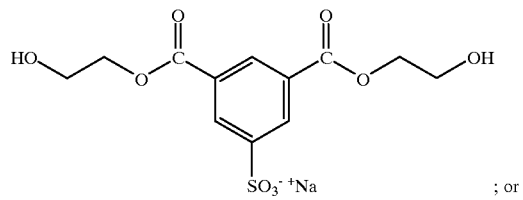

the bis(diethylene glycol) ester of sodium 5-sulfoisophthalate

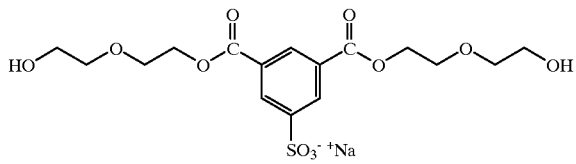

Typical diol reactants are aliphatic diols, including straight chain, branched, or cycloaliphatic alkane diols and may contain from 2 to 12 carbon atoms. Examples of such diols include ethylene glycol; propylene glycol, i.e., 1,2- and 1,3-propylene glycol; butane diol, i.e., 1,2-, 1,3- and 1,4-butane diol; diethylene glycol; 2,2-dimethyl-1,3-propane diol; 2-ethyl- and 2-methyl-1,3-propane diol; 1,3- and 1,5-pentane diol; dipropylene glycol; 2-methyl-1,5-pentane diol; 1,6-hexane diol; dimethanol decalin, dimethanol bicyclo octane; 1,4-cyclohexane dimethanol and particularly its cis- and trans-isomers; triethylene glycol; 1,10-decane diol; and mixtures of any of the foregoing. A preferred cycloaliphatic diol is 1,4-cyclohexane dimethanol or its chemical equivalent. When cycloaliphatic diols are used as the diol component, a mixture of cis- to trans-isomers may be used, it is preferred to have a trans isomer content of 70% or more. Chemical equivalents to the diols include esters, such as dialkyl esters, diaryl esters, and the like.

Examples of aromatic dicarboxylic acid reactants are isophthalic or terephthalic acid, 1,2-di(p-carboxyphenyl) ethane, 4,4'-dicarboxydiphenyl ether, 4,4'-bisbenzoic acid and mixtures thereof. All of these acids contain at least one aromatic nucleus. Acids containing fused rings can also be present, such as in 1,4-, 1,5-, or 2,6- naphthalene dicarboxylic acids. Preferred dicarboxylic acids include terephthalic acid, isophthalic acid or mixtures thereof.

A highly preferred polyester ionomer comprises repeating units of the formula:

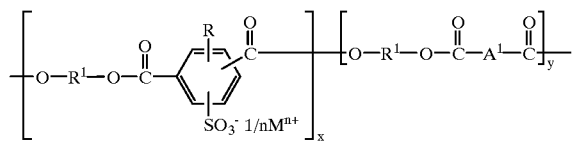

wherein R is hydrogen, halogen, alkyl having from one to about twenty carbons, or aryl having from one to about twenty carbons; M is a metal; n=1–5; $R^1$ is an alkylene radical having from one to about twelve carbon atoms; $A^1$ is a 1,2-phenylene, 1,3-phenylene, or 1,4-phenylene radical; and the mole fraction, x, of sulfonate-substituted units, is about 0.1 to about 50 percent of the sum of x and y, with about 0.2 to about 20 mole percent being preferred, about 0.5 to about 10 mole percent being more preferred, and about 1 to about 5 mole percent being even more preferred. Preferably R is hydrogen. Preferably $R^1$ is alkylene having from one to about six carbon atoms; more preferably $R^1$ is ethylene or butylene. M is preferably an alkali or alkaline earth metal; M is more preferably sodium or potassium.

Highly preferred ionomer polyesters include poly (ethylene terephthalate) (PET) ionomers, and poly(1,4-butylene terephthalate) (PBT) ionomers, and poly(1,3-propylene terephthalate) (PPT) ionomers.

Also contemplated herein are the above polyester ionomers with minor amounts, e.g., from about 0.5 to about 15 percent by weight, of units derived from aliphatic acid and/or aliphatic polyols to form copolyesters. The aliphatic polyols include glycols, such as poly(ethylene glycol) or poly(butylene glycol). Such polyesters can be made following the teachings of, for example, U.S. Pat. Nos. 2,465,319 and 3,047,539.

The preferred poly(1,4-butylene terephthalate) ionomer resin is one obtained by polymerizing an ionomer component comprising a glycol component comprising at least 70 mole percent, preferably at least 90 mole percent, of tetramethylene glycol; and an acid component comprising about 1 to about 10 mole percent of a dimethyl 5-sodium sulfo-1,3-phenylenedicarboxylate, and at least 70 mole percent, preferably at least 90 mole percent, of terephthalic acid, and polyester-forming derivatives thereof.

The glycol component preferably comprises not more than 30 mole percent, more preferably not more than 20 mole percent, of another glycol, such as ethylene glycol, trimethylene glycol, 2-methyl-1,3-propane glycol, hexamethylene glycol, decamethylene glycol, cyclohexane dimethanol, or neopentylene glycol.

The acid component preferably comprises not more than 30 mole percent, preferably not more than 20 mole percent, of another acid such as isophthalic acid, 2,6-naphthalene dicarboxylic acid, 1,5-naphthalene dicarboxylic acid, 4,4'-diphenyldicarboxylic acid, 4,4'-diphenoxyethane dicarboxylic acid, p-hydroxy benzoic acid, sebacic acid, adipic acid and polyester-forming derivatives thereof.

It is also possible to use a branched polyester ionomer comprising a branching agent, for example, a glycol having three or more hydroxyl groups or an aromatic carboxylic acid having three or more carboxylic acid groups. Furthermore, it is sometimes desirable to have various concentrations of acid and hydroxyl end groups on the polyester, depending on the ultimate end-use of the composition.

In some instances, it is desirable to reduce the number of acid end groups, typically to less than about 30 micro equivalents per gram, with the use of acid reactive species. In other instances, it is desirable that the polyester has a relatively high carboxylic end group concentration.

Preferred polyester ionomers will possess sufficient thermal stability to withstand compounding temperatures of at least about 250° C., preferably at least about 275° C., more preferably at least about 300° C.

Blends of polyesters ionomers with non sulfonate salt polyesters may also be employed as the polyester ionomer composition. For example, a blend of a sulfonate salt PBT and the unmodified PBT resin may be used. Preferred non sulfonate salt polyesters are the alkylene phthalate polyesters. It is preferred that the sulfonate salt polyester be present in an amount greater than or equal to the amount of the non sulfonate salt polyester.

A useful amount of polyester ionomer is about 0.01 to about 15 weight percent, with about 1 to about 10 weight percent preferred, and about 2 to about 8 weight percent especially preferred, wherein the weight percentages are based on the total weight of the composition.

The composition optionally comprises an impact modifier. All impact modifiers as generally used for compositions comprising a poly(arylene ether), a polyamide, or a combination of a poly(arylene ether) and a polyamide can be used. Particularly suitable are the so called block copolymers, for example, A-B-A triblock copolymers and A-B diblock copolymers. The A-B and A-B-A type block copolymer rubber additives which may be used are thermoplastic rubbers comprising one or two alkenyl aromatic blocks which are typically styrene blocks and a rubber block, e.g., a butadiene block which may be partially hydrogenated. Mixtures of these triblock copolymers and diblock copolymers are especially useful. In a preferred embodiment, the poly(arylene ether) phase comprises at least 50%, preferably at least 75%, more preferably at least 90%, of the block copolymer.

Suitable A-B and A-B-A type block copolymers are disclosed in, for example, U.S. Pat. Nos. 3,078,254, 3,402, 159, 3,297,793, 3,265,765, and 3,594,452 and U.K. Patent 1,264,741. Examples of typical species of A-B and A-B-A block copolymers include polystyrene-polybutadiene, polystyrene-poly(ethylene-propylene), polystyrene-polyisoprene, poly(α-methylstyrene)-polybutadiene, polystyrene-polybutadiene-polystyrene, polystyrene-poly(ethylene-propylene)-polystyrene, polystyrene-polyisoprene-polystyrene, poly(α-methylstyrene)-polybutadiene-poly(α-methylstyrene), polystyrene-poly(ethylene-butadiene)-polystyrene, as well as the selectively hydrogenated versions thereof, and the like. Polystyrene-poly(ethylene-propylene) and polystyrene-poly(ethylene-butadiene)-polystyrene are presently preferred. Mixtures of the aforementioned block copolymers are also useful. Such A-B and A-B-A block copolymers are available commercially from a number of sources, including Phillips Petroleum under the trademark SOLPRENE®, Shell Chemical Co. under the trademark KRATON®, Dexco under the trademark VECTOR®, and Kuraray under the trademark SEPTON®.

Other useful impact modifiers include functionalized elastomeric polyolefins such as elastomeric polyolefins comprising functional groups such as anhydride, epoxy, oxazoline, orthoester, and the like. The essential structural units of the elastomeric polyolefin are derived from ethylene and at least one $C_{3-8}$ 1-olefin, such as, propylene, 1-butene, 1-hexene and 1-octene. The proportions of ethylene and $C_{3-8}$ 1-olefin are not critical provided that they together constitute the major portion of the polymer. An example of a functionalized elastomeric polyolefin is a functionalized ethylene-propylene rubber or a functionalized ethylene-propylene-diene elastomer. The diene portion is at least one non-conjugated diene, such as ethylidene norbornene, 1,4-hexadiene, or dicyclopentadiene. These elastomeric polyolefins are known in the art as EPR and EPDM elastomers, and they are described more fully in U.S. application Ser. No. 09/064,270 filed Apr. 22, 1998, and U.S. application Ser. No. 09/307,194, filed May 7, 1999. In a preferred embodiment, the polyamide phase of the thermoplastic composition comprises at least 50%, preferably at least 75%, more preferably at least 90%, of the functionalized elastomeric polyolefin.

A useful amount of impact modifier is up to about 20 weight percent, with about 1 to about 15 weight percent preferred, and about 5 to about 12 weight percent especially preferred, wherein the weight percentages are based on the total weight of the composition. Various mixtures of the previous described impact modifiers are also useful.

The composition optionally comprises a conductive filler. The conductive filler may be any filler that enhances the conductivity of the molded composition. Suitable conductive fillers may be fibrous, disc-shaped, spherical or amorphous and include, for example, conductive carbon black; conductive carbon fibers, including milled fibers; conductive vapor grown carbon fibers, and various mixtures thereof. Other conductive fillers which can be used are metal-coated carbon fibers; metal fibers; metal disks; metal particles; metal-coated disc-shaped fillers such as metal-coated talcs, micas and kaolins; and the like. Preferred conductive fillers include carbon fibers, especially graphitic or partially graphitic vapor grown carbon fibers having diameters of about 3.5 to about 500 nanometers. Representative carbon fibers are the vapor grown carbon fibers described in, for example, U.S. Pat. Nos. 4,565,684 and 5,024,818 to Tibbetts et al.; U.S. Pat. No. 4,572,813 to Arakawa; U.S. Pat. Nos. 4,663, 230 and 5,165,909 to Tennent; U.S. Pat. No. 4,816,289 to Komatsu et al.; U.S. Pat. No. 4,876,078 to Arakawa et al.; U.S. Pat. No. 5,589,152 to Tennent et al.; and U.S. Pat. No. 5,591,382 to Nahass et al. The conductive additive can be added directly into the compatibilized blend during the melt processing step or preferably, the conductive additive can be pre-dispersed into either the poly(arylene ether) resin or the polyamide resin. It is preferable to pre-disperse the conductive additive into the polyamide phase to make a concentrate of the conductive additive in the resin that will ultimately become the continuous phase. It is preferred for the conductive material to reside primarily with the polyamide phase as greater conductivity can be achieved with a smaller amount of the conductive additive. It is also possible to use more than one conductive additive concentrate in the preparation of the resin composition. In a preferred embodiment, carbon fibers are introduced to the composition as a so-called masterbatch in polyamide. The masterbatch may comprise about 1 to about 40 weight percent carbon fibers, with the balance being polyamide. A suitable amount of conductive filler is an amount that reduces the specific volume resistivity of the molded composition to less than about $10^5$ Ohm-centimeters, preferably less than about $10^4$ Ohm-centimeters, more preferably about $10^3$ to about $10^4$ Ohm-centimeters.

The composition of the present invention may include additional components which do not interfere with the previously mentioned desirable properties but enhance other favorable properties such as antioxidants, lubricants, mold release materials, colorants, nucleating agents, and ultraviolet (UV) stabilizers.

Suitable antioxidants include, organophosphites, for example, tris(nonyl-phenyl)phosphite, tris(2,4-di-t-butylphenyl)phosphite, bis(2,4-di-t-butylphenyl) pentaerythritol diphosphite, and distearyl pentaerythritol diphosphite; alkylated monophenols, polyphenols and alkylated reaction products of polyphenols with dienes, such as, for example, tetrakis[methylene(3,5-di-tert-butyl-4-hydroxyhydrocinnamate)] methane, 3,5-di-tert-butyl-4-hydroxyhydrocinnamate octadecyl, 2,4-di-tert-butylphenyl phosphite, butylated reaction products of para-cresol and dicyclopentadiene, alkylated hydroquinones, hydroxylated thiodiphenyl ethers, alkylidene-bisphenols, benzyl compounds, esters of beta-(3,5-di-tert-butyl-4-hydroxyphenyl)propionic acid with monohydric or polyhydric alcohols, and esters of beta-(5-tert-butyl-4-hydroxy-3-methylphenyl)propionic acid with monohydric or polyhydric alcohols; and esters of thioalkyl or thioaryl compounds, such as, for example, distearylthiopropionate, and dilaurylthiopropionate, ditridecylthiodipropionate.

It is often desirous to utilize a metal salt in the compositions of the present invention. Such salts are generally known in the art as exemplified in U.S. Pat. No. 4,857,575 to van der Meer et al. and may be represented by the general formula:

where M represents a metal ion such as copper, nickel, tin, cerium etc. X represents a negatively charged ion, preferably a halide such as Cl, Br, F, I; or a carboxylate such as stearate or acetate; n represents an integer of 1 to about 6, y is an integer representing the positive ionic charge of the metal ion whereas z is an integer representing the negative ionic charge of X.

Among the suitable metal salts suitable for use in the present invention are $CuCl_2$, CuI, copper acetate and cerium stearate, all of which are commercially available from a variety of sources. Of these, CuI is preferred and is often used in combination with an additional halide source, e.g., KI. CuI may be obtained commercially or may be prepared by precipitation and isolation of the salt by reaction of copper metal and HI.

The metal halide salt will be utilized in amounts necessary to provide effective stabilization. Ordinarily at least 0.001 parts by weight of the metal halide will be necessary per 100 parts by weight of the PPE-polyamide base resin. More than about 0.5 parts metal halide per 100 parts PPE-polyamide resin will not typically afford sufficient additional benefit to justify its use at such levels. It has been found that metal salts were effective at levels as low as 200 ppm for stabilization of PPE-polyamide blends of the present invention. It is also possible to provide in situ generation of a metal halide by utilizing a metal carboyxlate such as cerium stearate in the presence of a halide source such as KI.

The preparation of the compositions of the present invention is normally achieved by merely blending the ingredients under conditions for the formation of an intimate blend. Such conditions often include mixing in single or twin screw type extruders or similar mixing devices that can apply a shear to the components.

All of the ingredients may be added initially to the processing system. Alternatively, certain additives may be precompounded with one or more of the primary components, preferably the poly(arylene ether), impact modifier and the polyamide. It appears that certain physical properties are improved if the polyester ionomer is added downstream of the polyamide addition. For example, the polyester ionomer may be added in a third extruder port downstream of the first extruder port (where the poly (arylene ether), the compatibilizing agent, optionally, the impact modifier, and, optionally, a portion of the polyamide are added) and the second extruder port (where all or the remainder of the polyamide is added). Alternatively, the polyester ionomer may be added as a so-called pellet blend immediately prior to injection molding. While separate extruders may be used in the processing, the compositions are preferably prepared by using a single extruder having multiple feed ports along its length to accommodate the addition of the various components. It is often advantageous to apply a vacuum or atmospheric vent to the melt through at least one or more vent ports in the extruder to remove volatile impurities in the composition. Those of ordinary skill in the art will be able to adjust blending times and temperatures, as well as component addition, without undue additional experimentation.

The blends of this invention can be processed by various techniques including injection molding, blow molding, extrusion into sheet, film or profiles, compression molding and the like. They can also be formed into a variety of articles for use in, for example, electrical connectors, electrical devices, computers, building and construction, outdoor equipment, trucks and automobiles.

The invention is further illustrated by the following non-limiting examples.

Materials

Poly(2,6-dimethylphenylene ether) was obtained from GE Plastics and had a weight average molecular weight (Mw) of about 44,000 and an intrinsic viscosity of about 0.4 deciliters per gram (dl/g) measured in chloroform at 23° C.

Nylon-6,6 was obtained as 24 FE 1 from Rhodia and had a weight average molecular weight (Mw) of 69,000 and a viscosity number ISO 307 (Vz) of 126 ml/g.

Poly(ethylene terephthalate) ionomers (PET-I) were obtained from DuPont under the trademark CRYSTAR® as CRYSTAR® Merge 3918 and Merge 1908. These materials contain, respectively, 1.72 mole percent and 2.0 mole percent of sodium 5-sulfoisophthalate units, where the mole percent is based on the total of terephthalate and sulfoisophthalate units. Merge 3918 and Merge 1908 also contain, respectively, 0.03 weight percent and 0.29 weight percent, respectively, of titanium dioxide. Both materials exhibited melting points of 255° C.

The poly(butylene terepthalate) ionomer (PBT-I) is a copolymer of dimethyl terephthalate (DMT), sodium dimethyl-5-sulfoisophthalate (DMSIP) and 1,4-butanediol (BDO). Synthesis of these materials is described in U.S. application Ser. No. 09/251,507, filed Feb. 17, 1999. The PBT-ionomer resin compositions used in these experiments contain 3 mole percent (PBT-I 3%), 1 mole percent (PBT-I 1%), or 0.5 mole percent (PBT-I 0.5%) sodium sulfonate-substituted monomer, based on the total moles of isophthalate and terephthalate monomers.

Polystyrene-poly(ethylene butylene)-polystyrene block copolymer (SEBS) was obtained as KRATON® G1651E from Shell Nederland BV and had an Mw of 267,500. Polystyrene-poly(ethylene propylene) block copolymer (SEP) was obtained as KRATON® G1701E from Shell Nederland BV and had an Mw of 152400.

Citric acid was obtained from Jungbunzlauer BV. Fumaric acid was obtained from Lonza Benelux BV. Potassium iodide was obtained from GE Plastics and used as a 50 weight percent solution in water. Cuprous iodide (CuI) was obtained from DSM Adeno. A hindered phenol antioxidant was obtained as IRGANOX® 1076 from Ciba Geigy.

Vapor grown carbon fibers were obtained from Hyperion Catalysis International and were prepared according to U.S. Pat. No. 5,591,382 to Nahass et al. The fibers had an average diameter of about 15 nanometers. The carbon fibers were used as a 20 weight percent masterbatch in nylon-6,6.

EXAMPLE 1

This example describes the formulation and testing of compositions comprising PET ionomers and varying in the type of PET ionomer, the amount of PET ionomer (which is confounded with the amount of nylon-6,6), and the point of addition of the PET ionomer. Izod notched impact strengths were measured at 23° C. according to ISO 180. Vicat B softening temperatures were measured according to ISO 306. Moisture absorption tests were conducted on disc-shaped samples for various times under three sets of conditions: 23° C./50% relative humidity, 23° C./100% relative humidity, and 80° C./100% relative humidity. Prior to their initial weighing, all samples were dried in a vacuum oven at 120° C. for four hours. Moisture results are reported for 69 hours at 80° C. and 100% relative humidity.

Compositions and test results are given in Table 1. The results show that Izod notched impact strength is higher at 4.88 weight percent ionomer than at 9.76 weight percent ionomer (see formulation 2 vs. 3; 4 vs. 5; 6 vs. 7; 8 vs. 9). It is also evident that, compared to downdownstream addition of the ionomer, the addition of the ionomer in a pellet blend (immediately prior to molding), is associated with higher Izod notched impact strengths (see formulation 4 vs. 2; 5 vs. 3; 8 vs. 6; 9 vs. 7). All experimental samples 2–9 exhibit lower water absorption than the control formulation 1. While each of the experimental formulations may be suitable for some purposes, the best balance of properties was observed for samples 4 and 8, which each comprise 4.88 weight percent ionomer added in a pellet blend (immediately prior to molding).

TABLE 1

|  | Control | experimental formulations | | | | | | | |
|---|---|---|---|---|---|---|---|---|---|
|  | 1 | 2 | 3 | 4 | 5 | 6 | 7 | 8 | 9 |
| Composition (weight %) | | | | | | | | | |
| PPO ® 803 | 38.8 | 38.8 | 38.8 | 38.8 | 38.8 | 38.8 | 38.8 | 38.8 | 38.8 |
| SEBS | 7 | 7 | 7 | 7 | 7 | 7 | 7 | 7 | 7 |
| SEP | 3.5 | 3.5 | 3.5 | 3.5 | 3.5 | 3.5 | 3.5 | 3.5 | 3.5 |
| Citric acid | 0.65 | 0.65 | 0.65 | 0.65 | 0.65 | 0.65 | 0.65 | 0.65 | 0.65 |
| IRGANOX ® 1076 | 0.3 | 0.3 | 0.3 | 0.3 | 0.3 | 0.3 | 0.3 | 0.3 | 0.3 |
| KI, 50% in water | 0.1 | 0.1 | 0.1 | 0.1 | 0.1 | 0.1 | 0.1 | 0.1 | 0.1 |
| CuI | 0.01 | 0.01 | 0.01 | 0.01 | 0.01 | 0.01 | 0.01 | 0.01 | 0.01 |
| Merge 3918 (1.72 mol %) | — | 4.88 | 9.76 | 4.88 | 9.76 | — | — | — | — |
| Merge 1908 (2 mol %) | — | — | — | — | — | 4.88 | 9.76 | 4.88 | 9.76 |
| Ionomer addition point | — | DDS** | DDS | PB* | PB | DDS | DDS | PB | PB |
| Nylon-6,6 | 44 | 39.12 | 34.24 | 39.12 | 34.24 | 39.12 | 34.24 | 39.12 | 34.24 |
| 20% CF in PA | 6 | 6 | 6 | 6 | 6 | 6 | 6 | 6 | 6 |
| Properties | | | | | | | | | |
| Izod Notched Impact (kJ/m$^2$) | 22.1 | 8.1 | 5.2 | 18.4 | 15.2 | 15.5 | 9.1 | 19.7 | 14 |
| Vicat-B (° C.) | 199.8 | 196.5 | 192.1 | 199.5 | 194.3 | 195.5 | 192.9 | 195.7 | 190.6 |
| Moisture absorption (% weight increase after 69 hours at 80° C./100% RH) | 3.56 | — | — | 3.36 | 3.18 | 3.38 | 3.10 | 3.41 | 3.21 |

*PB = Pellet Blend
**DDS5 = DownDownStream

EXAMPLE 2

This example describes the formulation and testing of compositions comprising PBT ionomers and varying in the type of PBT ionomer (i.e., the mole fraction of ionic monomer), the amount of PBT ionomer, and the identity of the compatibilizing agent (citric acid vs. fumaric acid). In all cases, the PBT ionomers were added as a pellet blend.

Ten formulations, 10–19, were prepared, varying in the amount of ionomer (0, 5, or 10 weight percent of the total composition), the mole fraction of sulfonated monomer in the ionomer (0.5, 1 or 3 mole percent), and the non-polymeric compatibilizing agent (citric acid or fumaric acid). Izod notched impact strength, Vicat B softening temperature and water absorption were measured as described in Example 1. Moisture results are reported for 24 hours at 80° C. and 100% relative humidity. Compositions and test results are given in Table 2.

The results demonstrate that Izod notched impact strength was relatively insensitive to the sulfonated monomer content of the ionomer (formulation 11 vs. 14 vs. 17; 12 vs. 15 vs. 18; 13 vs. 16 vs. 19). The results also show that high levels of ionomer slightly degraded Izod notched impact strength (11 vs. 13; 14 vs. 16; 17 vs. 19), and that Izod notched impact strength was slightly higher with fumaric acid compatibilizer versus citric acid compatibilizer (11 vs. 12; 14 vs. 15; 17 vs. 18). Higher ionomer levels are generally associated with lower Vicat B temperatures (11 vs. 13; 14 vs. 16; 17 vs. 19), and all the samples with 4.88% ionomer exhibited excellent Vicat B temperatures. Comparison of these results with results in Example 1 indicate that the PBT ionomers tests enable higher Vicat B temperatures than the PET ionomers tested. This was unexpected given that the PET ionomers have higher melting temperatures. It is not clear whether the Vicat B temperatures might have been adversely effected by the presence of a small amount of titanium dioxide in the PET ionomers tested.

TABLE 2

|  | Control | Experimental formulations | | | | | | | | |
|---|---|---|---|---|---|---|---|---|---|---|
|  | 10 | 11 | 12 | 13 | 14 | 15 | 16 | 17 | 18 | 19 |
| Composition (weight %) | | | | | | | | | | |
| PPO ® 803 | 38.8 | 38.8 | 38.8 | 38.8 | 38.8 | 38.8 | 38.8 | 38.8 | 38.8 | 38.8 |
| SEBS | 7 | 7 | 7 | 7 | 7 | 7 | 7 | 7 | 7 | 7 |
| SEP | 3.5 | 3.5 | 3.5 | 3.5 | 3.5 | 3.5 | 3.5 | 3.5 | 3.5 | 3.5 |
| Citric acid | 0.65 | 0.65 | — | 0.65 | 0.65 | — | 0.65 | 0.65 | — | 0.65 |
| Fumaric acid | — | — | 0.65 | — | — | 0.65 | — | — | 0.65 | — |
| IRGANOX ® 1076 | 0.3 | 0.3 | 0.3 | 0.3 | 0.3 | 0.3 | 0.3 | 0.3 | 0.3 | 0.3 |
| KI, 50% in water | 0.1 | 0.1 | 0.1 | 0.1 | 0.1 | 0.1 | 0.1 | 0.1 | 0.1 | 0.1 |
| CuI | 0.01 | 0.01 | 0.01 | 0.01 | 0.01 | 0.01 | 0.01 | 0.01 | 0.01 | 0.01 |
| Nylon-6,6 | 44 | 39.12 | 39.12 | 34.24 | 39.12 | 39.12 | 34.24 | 39.12 | 39.12 | 34.24 |
| 20% CF in PA | 6 | 6 | 6 | 6 | 6 | 6 | 6 | 6 | 6 | 6 |
| PBTI-0.5% | — | 4.88 | 4.88 | 9.76 | — | — | — | — | — | — |
| PBTI-1% | — | — | — | — | 4.88 | 4.88 | 9.76 | — | — | — |
| PBTI-3% | — | — | — | — | — | — | — | 4.88 | 4.88 | 9.76 |

TABLE 2-continued

|  | Control | Experimental formulations | | | | | | | | |
|---|---|---|---|---|---|---|---|---|---|---|
|  | 10 | 11 | 12 | 13 | 14 | 15 | 16 | 17 | 18 | 19 |
| Properties | | | | | | | | | | |
| Izod Notched Impact (kJ/m$^2$) | 23.1 | 19.7 | 20.2 | 14.1 | 19.4 | 20 | 13.6 | 18.5 | 20.7 | 12.9 |
| Vicat-B (° C.) | 198.9 | 198.8 | 196.5 | 193.7 | 196.9 | 198.2 | 195.2 | 196.6 | 196.8 | 193.9 |
| Moisture absorption (% weight increase after 24 hours at 80° C./100% RH) | 2.98 | 2.73 | 2.80 | 2.47 | 2.46 | 2.49 | 2.29 | 2.53 | 2.54 | 2.38 |

EXAMPLE 3

This example describes formulation and testing of a reference composition plus fifteen experimental compositions that constitute a designed experiment with variations in PBT ionomer concentration, nylon-6,6 concentration, carbon fiber concentration, PBT ionomer type (0.5 mole percent or 1.0 mole percent ionic monomer), and compatibilizer type (citric acid or fumaric acid). All components were added at the throat of the extruder, except for nylon-6,6 and the carbon fiber/nylon-6,6 blend added downstream, and the PBT ionomer added as a pellet blend prior to molding. Izod notched impact strength and Vicat B softening temperature were measured as described in Example 1. Specific volume resistivity was measured as follows. The ends of a molded tensile bar (type MPTS, ISO 3167) were broken off in a brittle fashion to produce a bar about 75 mm long and 10 mm by 4 mm in cross section. The two fractured surfaces were painted with a conductive silver paint, and once the paint had dried, the resistance across the length of the bar was measured with a normal multimeter. Volume resistivity, was calculated according to the equation

[Ohm-cm]=($R_{measured}$[Ohm])×(fracture area[cm$^2$])/ (length[cm])

where $R_{measured}$ is the measured resistance. Sample conductivities are sensitive to molding conditions, and sample-to-sample variability for the same composition is sometimes observed.

Compositions and test results are given in Table 3. Statistical analysis of property values as a function of composition produced significant models for Izod notched impact ($R^2$=0.9837, $R^2$(adj)=0.9764) and specific volume resistivity ($R^2$=0.8966, $R^2$(adj)=0.8684). Higher Izod notched impact values were favored by greater amounts of nylon-6,6 and lower amounts of PBT ionomers. In general, the Izod notched impact performance of the experimental formulations was quite good, with eleven of fifteen samples achieving a highly desirable value of 16 kJ/m$^2$ or greater. Lower resistivity was favored, as expected, by higher concentrations of carbon fibers, but also by higher concentrations of ionomer and by the use of citric acid instead of fumaric acid. The result that higher concentrations of ionomer decrease resistivity has practical significance because it means that lesser amounts of expensive carbon fibers can be used to achieve a given desired level of resistivity, and the overall cost of the formulation can be reduced.

TABLE 3

|  | control | Experimental formulations | | | | | | | |
|---|---|---|---|---|---|---|---|---|---|
|  | 20 | 21 | 22 | 23 | 24 | 25 | 26 | 27 | |
| Composition (weight %) | | | | | | | | | |
| PPO ® 803 | 38.8 | 38.8 | 38.8 | 38.8 | 38.8 | 38.8 | 38.8 | 38.8 | |
| SEBS | 7 | 7 | 7 | 7 | 7 | 7 | 7 | 7 | |
| SEP | 3.5 | 3.5 | 3.5 | 3.5 | 3.5 | 3.5 | 3.5 | 3.5 | |
| citric acid | 0.65 | — | — | — | 0.65 | 0.65 | — | 0.65 | |
| fumaric acid | — | 0.65 | 0.65 | 0.65 | — | — | 0.65 | — | |
| IRGANOX ® 1076 | 0.3 | 0.3 | 0.3 | 0.3 | 0.3 | 0.3 | 0.3 | 0.3 | |
| KI, 50% in water | 0.1 | 0.1 | 0.1 | 0.1 | 0.1 | 0.1 | 0.1 | 0.1 | |
| CuI | 0.01 | 0.01 | 0.01 | 0.01 | 0.01 | 0.01 | 0.01 | 0.01 | |
| nylon-6,6 | 44 | 39.8 | 37.32 | 38.2 | 39.8 | 38.2 | 34.64 | 38.56 | |
| 20% CF in PA | 6 | 4 | 5 | 6 | 4 | 6 | 6 | 4.5 | |
| PBTI-1% | — | 5.84 | — | — | 5.84 | 5.44 | 9 | — | |
| PBTI-0.5% | — | — | 7.32 | 5.44 | — | — | — | 6.58 | |
| Properties | | | | | | | | | |
| Izod Notched Impact (kJ/m$^2$) | 22.8 | 19.4 | 17.7 | 19.2 | 17.4 | 17.6 | 15.4 | 16.8 | |
| Specific Volume Resistivity (kOhm · cm) | 2.8 | — | 8.8 | 22.5 | 12.9 | 0.61 | 8.1 | 5.8 | |

TABLE 3-continued

| | Experimental formulations | | | | | | | |
|---|---|---|---|---|---|---|---|---|
| | 28 | 29 | 30 | 31 | 32 | 33 | 34 | 35 |
| Composition (weight %) | | | | | | | | |
| PPO ® 803 | 38.8 | 38.8 | 38.8 | 38.8 | 38.8 | 38.8 | 38.8 | 38.8 |
| SEBS | 7 | 7 | 7 | 7 | 7 | 7 | 7 | 7 |
| SEP | 3.5 | 3.5 | 3.5 | 3.5 | 3.5 | 3.5 | 3.5 | 3.5 |
| citric acid | 0.65 | — | 0.65 | 0.65 | — | — | 0.65 | — |
| fumaric acid | — | 0.65 | — | — | 0.65 | 0.65 | — | 0.65 |
| IRGANOX ® 1076 | 0.3 | 0.3 | 0.3 | 0.3 | 0.3 | 0.3 | 0.3 | 0.3 |
| KI, 50% in water | 0.1 | 0.1 | 0.1 | 0.1 | 0.1 | 0.1 | 0.1 | 0.1 |
| CuI | 0.01 | 0.01 | 0.01 | 0.01 | 0.01 | 0.01 | 0.01 | 0.01 |
| nylon-6,6 | 35.98 | 36.64 | 38.2 | 34.64 | 36.64 | 38.2 | 36.98 | 37.32 |
| 20% CF in PA | 5.5 | 4 | 6 | 6 | 4 | 6 | 4.5 | 5 |
| PBTI-1% | — | 9 | 5.44 | 9 | 9 | 5.44 | — | — |
| PBTI-0.5% | 8.16 | — | — | — | — | — | 8.16 | 7.32 |
| Properties | | | | | | | | |
| Izod Notched Impact (kJ/m$^2$) | 14.6 | 17.5 | 17.8 | 14.8 | 17.2 | 20.0 | 15.7 | 17.8 |
| Specific Volume Resistivity (kOhm · cm) | 0.81 | — | 0.4 | 0.44 | — | 46.0 | 3.5 | — |

EXAMPLE 4

This experiment describes formulation and testing of additional compositions comprising citric acid, PBT ionomers with 0.5 mole percent or 1.0 mole percent ionic monomers, and reduced levels of carbon fibers. Compositions and results for Izod notched impact, Vicat B temperature, and specific volume resistivity are presented in Table 4. The results show that formulations 36 and 37 both exhibit an excellent balance of physical and conductive properties while requiring a lesser amount of carbon fibers than the control formulation. Data for moisture absorption over time at 20° C., 50% relative humidity are given in Table 5. The results show that water absorption by experimental formulations 36 and 37 stabilizes at a lower level (about 1.15 weight percent increase) than for control formulation 20 (about 1.35 weight percent increase).

TABLE 4

| | control | Experimental formulations | |
|---|---|---|---|
| | 20 | 36 | 37 |
| Composition (weight %) | | | |
| PPO ® 803 | 38.8 | 38.8 | 38.8 |
| SEBS | 7 | 7 | 7 |
| SEP | 3.5 | 3.5 | 3.5 |
| citric acid | 0.65 | 0.65 | 0.65 |
| IRGANOX ® 1076 | 0.3 | 0.3 | 0.3 |
| KI, 50% in water | 0.1 | 0.1 | 0.1 |
| CuI | 0.01 | 0.01 | 0.01 |
| nylon-6,6 | 44 | 39.92 | 39.92 |
| 20% CF in PA | 6 | 5 | 5 |
| PBTI-0.5% | — | 4.88 | — |
| PBTI-1% | — | — | 4.88 |
| Properties | | | |
| Izod Notched Impact (kJ/m$^2$) | 22.8 | 16.9 | 17.9 |
| Vicat-B (° C.) | 202.4 | 197.4 | 196.7 |
| Specific Volume Resistivity (kOhm.cm) | 2.8 | 1.6 | 1.3 |

TABLE 5

| | Weight increase (weight precent) due to water absorption | | |
|---|---|---|---|
| | Control | Experimental formulations | |
| Days | 20 | 36 | 37 |
| 0 | 0 | 0 | 0 |
| 1 | 0.23 | 0.21 | 0.21 |
| 3 | 0.39 | 0.42 | 0.43 |
| 5 | 0.50 | 0.52 | 0.52 |
| 7 | 0.60 | 0.61 | 0.61 |
| 8 | 0.64 | 0.67 | 0.67 |
| 10 | 0.74 | 0.73 | 0.72 |
| 12 | 0.79 | 0.75 | 0.74 |
| 13 | 0.84 | 0.78 | 0.79 |
| 14 | 0.86 | 0.82 | 0.84 |
| 15 | 0.89 | 0.84 | 0.85 |
| 17 | 0.95 | 0.87 | 0.86 |
| 19 | 1.00 | 0.90 | 0.91 |
| 21 | 1.04 | 0.94 | 0.94 |
| 24 | 1.14 | 0.95 | 0.94 |
| 26 | 1.14 | 1.02 | 0.99 |
| 27 | 1.13 | 1.02 | 1.00 |
| 28 | 1.13 | 1.02 | 1.01 |
| 29 | 1.12 | 1.03 | 1.02 |
| 31 | 1.20 | 1.03 | 1.02 |
| 33 | 1.30 | 1.05 | 1.05 |
| 35 | 1.36 | 1.08 | 1.07 |
| 38 | 1.34 | 1.09 | 1.10 |
| 39 | 1.30 | 1.10 | 1.12 |
| 42 | 1.30 | 1.15 | 1.15 |
| 43 | 1.34 | 1.16 | 1.15 |
| 45 | 1.31 | 1.17 | 1.15 |
| 48 | 1.28 | 1.21 | 1.21 |
| 52 | 1.27 | 1.24 | 1.27 |
| 56 | 1.23 | 1.26 | 1.27 |
| 57 | 1.22 | 1.25 | 1.27 |
| 59 | 1.22 | 1.24 | 1.26 |
| 60 | 1.24 | 1.21 | 1.26 |
| 66 | 1.26 | 1.18 | 1.17 |
| 74 | 1.28 | 1.11 | 1.1 |
| 78 | 1.32 | 1.14 | 1.15 |

A one-way analysis of variance was calculated from the point that the weight percent increase by moisture absorption reached a plateau. For the control formulation 20, a plateau is reached after approximately 30 days (about 1.35 weight percent increase), and for the experimental formulations 36 and 37 after approximately 50 days (about 1.15 weight percent increase). The analysis, summarized below, shows that this difference is statistically significant. This difference would be expected to be manifested as a practical difference in improved dimensional stability due to reduced moisture absorption.

| Analysis of Variance for Weight % | | | | | |
|---|---|---|---|---|---|
| Source | DF | SS | MS | F | P |
| PBTI-% | 2 | 0.05432 | 0.02716 | 10.62 | 0.000 |
| Error | 33 | 0.08440 | 0.00256 | | |
| Total | 35 | 0.13872 | | | |

| Individual 95% CIs For Mean Based on Pooled StDev | | | | |
|---|---|---|---|---|
| Level | N | Mean | StDev | |
| Control form. 20 | 0.0 | 16 | 1.2856 | 0.0437 |
| Exp. form. 36 | 0.5 | 10 | 1.2000 | 0.0508 |
| Exp. form. 37 | 1.0 | 10 | 1.2170 | 0.0602 |
| Pooled StDev = | 0.0506 | 1.200 | 1.240 | 1.280 |

EXAMPLE 5

This experiment demonstrates improved paint adhesion for articles molded from the composition.

A poly(ethylene terephthalate) ionomer containing 1.72 mole percent sodium sulfonate-substituted isophthalate groups and three different poly(butylene terephthalate) ionomers containing 0.5, 1.0, or 3 mole percent sodium sulfonate-substituted isophthalate groups were investigated as ternary components. The amount added of these ionomers in the experimental formulations varied between 1 and 4 weight percent of the total composition.

Izod notched impact strength, Vicat B softening temperature, and specific volume resistivity were measured according to procedures described above. Tensile elongation was measured according to ISO 306. The paint adhesion test was conducted as follows. A 10 cm diameter disk was spray painted with the following paint system:

a Sandouville primer 50062

Flins basecoat 71432 "base Blue de methyl"

Flins clearcoat 81038H to give a paint layer approximately 40 to 80 micrometers thick. In the center of the painted disk, a sharp knife was used to cut a cross in the center of the painted surface, extending through the paint layer into the molded plastic layer. A steam jet (65 bar, 70° C.) was then aimed at the center of the cross from a distance of 10 cm, and the sample was blasted with steam for 30 seconds. Paint adhesion failures typically occurred, if at all, first at the intersection of the cross, and paint flaked off from that point. The area from which paint was removed was assessed by overlaying a grid of 2 mm by 2 mm squares on top of the disk and counting the number of squares from which at least some paint had been visibly removed. Total failure of paint adhesion would have corresponded to 392 failed squares.

Formulations and test results are given in Table 6.

TABLE 6

| | control | experimental formulations | | | | | | | | | | | |
|---|---|---|---|---|---|---|---|---|---|---|---|---|---|
| | 38 | 39 | 40 | 41 | 42 | 43 | 44 | 45 | 46 | 47 | 48 | 49 | 50 |
| Composition (weight percent) | | | | | | | | | | | | | |
| PPO 803 | 38.44 | 38.44 | 38.44 | 38.44 | 38.44 | 38.44 | 38.44 | 38.44 | 38.44 | 38.44 | 38.44 | 38.44 | 38.44 |
| SEBS rubber | 7 | 7 | 7 | 7 | 7 | 7 | 7 | 7 | 7 | 7 | 7 | 7 | 7 |
| SEP rubber | 3.5 | 3.5 | 3.5 | 3.5 | 3.5 | 3.5 | 3.5 | 3.5 | 3.5 | 3.5 | 3.5 | 3.5 | 3.5 |
| citric acid | 0.65 | 0.65 | 0.65 | 0.65 | 0.65 | 0.65 | 0.65 | 0.65 | 0.65 | 0.65 | 0.65 | 0.65 | 0.65 |
| IRGANOX ® 1076 | 0.3 | 0.3 | 0.3 | 0.3 | 0.3 | 0.3 | 0.3 | 0.3 | 0.3 | 0.3 | 0.3 | 0.3 | 0.3 |
| KI, 50% in water | 0.1 | 0.1 | 0.1 | 0.1 | 0.1 | 0.1 | 0.1 | 0.1 | 0.1 | 0.1 | 0.1 | 0.1 | 0.1 |
| CuI | 0.01 | 0.01 | 0.01 | 0.01 | 0.01 | 0.01 | 0.01 | 0.01 | 0.01 | 0.01 | 0.01 | 0.01 | 0.01 |
| PA 6,6 | 44 | 43 | 42 | 40 | 43 | 42 | 40 | 43 | 42 | 40 | 43 | 42 | 40 |
| 20% CF in PA 6,6 | 6 | 6 | 6 | 6 | 6 | 6 | 6 | 6 | 6 | 6 | 6 | 6 | 6 |
| PBT-ionomer 0.5% | — | 1 | 2 | 4 | — | — | — | — | — | — | — | — | — |
| PBT-ionomer 1% | — | — | — | — | 1 | 2 | 4 | — | — | — | — | — | — |
| PBT-ionomer 3% | — | — | — | — | — | — | — | 1 | 2 | 4 | — | — | — |
| PET-ionomer 1.72% | — | — | — | — | — | — | — | — | — | — | 1 | 2 | 4 |
| Properties | | | | | | | | | | | | | |
| Izod notched impact (kJ/m$^2$) | 23.6 | 22.1 | 17.9 | 16.7 | 19.0 | 18.2 | 16.7 | 20.9 | 18.0 | 17.5 | 20.6 | 19.5 | 18.0 |
| tensile elongation (%) | 30.5 | 37.1 | 42.1 | 34.1 | 38.2 | 45.0 | 36.0 | 37.6 | 34.0 | 26.4 | 29.7 | 39.8 | 28.9 |
| Vicat B (° C.) | 198.1 | 199.8 | 200.1 | 198.6 | 203.5 | 201.5 | 200.1 | 202.5 | 200.2 | 199.2 | 199.6 | 199.4 | 199.8 |
| Volume Resistivity (kOhm · cm) | 2.8 | 3.8 | 2.1 | 1.6 | 2.2 | 1.1 | 1.3 | — | 1.3 | 0.9 | 2.8 | — | 3.0 |
| Paint Square Failures (no. of failures out of 392 total squares) | 90 | 29 | 4 | 0 | 18 | 5 | 0 | 0 | 8 | 0 | 35 | 2 | 0 |

The test data show a significant increase in paint adhesion, compared to the control, for all the formulations containing PBT-ionomer and PET-ionomer as compared to the control formulation. This advantage in paint adhesion is achieved even at very low levels of ionomer (e.g., 1 weight percent).

The results also show that paint adhesion is fairly insensitive to ionic monomer content of the ionomer. That is, PBT-I 0.5% enhances paint adhesion about as well as PBT-I 3%. The ionic content can thus be dictated by other properties, such as compatibilization of the ionomer with nylon-6,6. These experiments also show that adding up to 4% ionomer to the formulation has little effect on the Vicat-B softening temperature. In fact, for inventive formulations 39–50, the Vicat-B was even a few degrees celcius higher than that for the control formulation 38. Likewise, the addition of 1–4% ionomer appeared to have little effect on mechanical properties. While Izod impact strengths decreased slightly, in most cases the tensile elongation properties were slightly improved for the inventive formulations 39–50 compared to the control formulation 38.

All cited patents and other references are incorporated herein by reference.

While preferred embodiments have been shown and described, various modifications and substitutions may be made thereto without departing from the spirit and scope of the invention. Accordingly, it is to be understood that the present invention has been described by way of illustration and not limitation.

What is claimed is:

1. A thermoplastic composition, comprising:
   about 5 to about 95 weight percent of a poly(arylene ether);
   about 5 to about 95 weight percent of a polyamide;
   about 0.01 to about 10 weight percent of a compatibilizing agent; and
   about 0.1 to about 20 weight percent of a polyester ionomer which is the polycondensation product of (1) an aromatic dicarboxylic acid or its ester-forming derivative; (2) a diol compound or its ester-forming derivative; and (3) an ester-forming compound containing an ionic sulfonate group;
   wherein weight percentages are based on the total weight of the composition.

2. The composition of claim 1, wherein the poly(arylene ether) comprises a plurality of repeating structural units of the formula:

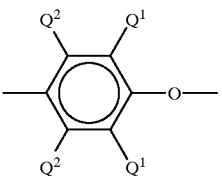

wherein for each structural unit, each $Q^1$ is independently halogen, primary or secondary alkyl having from one to about seven carbon atoms, phenyl, haloalkyl, aminoalkyl, hydrocarbonoxy, or halohydrocarbonoxy wherein at least two carbon atoms separate the halogen and oxygen atoms; and each $Q^2$ is independently hydrogen, halogen, primary or secondary alkyl having from one to about seven carbon atoms, phenyl, haloalkyl, hydrocarbonoxy or halohydrocarbonoxy as defined for $Q^1$.

3. The composition of claim 1, wherein the poly(arylene ether) comprises a plurality of 2,6-dimethylphenylene ether units.

4. The composition of claim 1, comprising about 20 to about 60 weight percent poly(arylene ether).

5. The composition of claim 1, wherein the polyamide comprises at least one material selected from the group consisting of nylon-6; nylon-6,6; nylon-4,6; nylon-12; nylon-6,10; nylon 6,9; and nylon 6/6T and nylon 6,6/6T with triamine contents below about 0.5 weight percent.

6. The composition of claim 1, wherein the polyamide comprises nylon-6 or nylon-6,6.

7. The composition of claim 1, comprising about 20 to about 60 weight percent polyamide.

8. The composition of claim 1, wherein the compatibilizing agent comprises citric acid or fumaric acid.

9. The composition of claim 1, comprising about 0.1 to about 3 weight percent compatibilizing agent.

10. The composition of claim 1, wherein the aromatic dicarboxylic acid or its ester-forming derivative comprises terephthalic acid or isophthalic acid.

11. The composition of claim 1, wherein the diol compound or its ester-forming derivative comprises ethylene glycol or butylene glycol.

12. The composition of claim 1, wherein the polyester ionomer comprises sulfonate salt units represented by the formula:

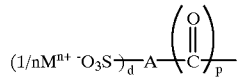

or the formula:

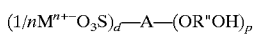

wherein p=1–3; d=1–3; p+d=2–6; A is an aryl group containing at least one aromatic ring; and the sulfonate substituent is directly attached to an aromatic ring.

13. The composition of claim 1, wherein the polyester ionomer comprises divalent ionomer units represented by the formula:

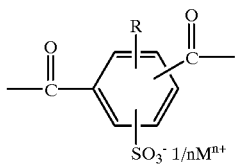

wherein R is hydrogen, halogen, alkyl having from one to about twenty carbons, or aryl having from six to about twenty carbons; M is a metal; and n=1–5.

14. The composition of claim 1, wherein the ester-forming compound containing an ionic sulfonate group is selected from the group consisting of sodium 3,5-dicarbomethoxybenzene sulfonate, the bis(ethylene glycol) ester of sodium 5-sulfoisophthalate, and the bis(diethylene glycol) ester of sodium 5-sulfoisophthalate.

15. The composition of claim 1, wherein the polyester ionomer comprises about 0.1 to about 50 mole percent of units derived from the ester-forming compound containing an ionic sulfonate group, based on the sum of units derived from the ester-forming compound containing an ionic sulfonate group and units derived from the aromatic dicarboxylic acid or its ester-forming derivative.

16. The composition of claim 1, comprising about 1 to about 15 weight percent of the polyester ionomer.

17. The thermoplastic composition of claim 1, further comprising an impact modifier.

18. The thermoplastic composition of claim 17, wherein the impact modifier is selected from the group consisting of polystyrene-poly(ethylene-butadiene)-polystyrene block copolymers and polystyrene-poly(ethylene-propylene) block copolymers.

19. The thermoplastic composition of claim 1, further comprising a conductivity-enhancing filler.

20. The thermoplastic composition of claim 19, having a volume resistivity after molding not greater than about $1 \times 10^4$ Ohm-centimeter.

21. The thermoplastic composition of claim 19, having a volume resistivity after molding of about $1 \times 10^3$ to about $1 \times 10^4$ Ohm-centimeter.

22. The thermoplastic composition of claim 19, wherein the conductivity enhancing filler comprises carbon fibers.

23. The thermoplastic composition of claim 22, wherein the carbon fibers have diameters of about 3.5 to about 500 nanometers.

24. The thermoplastic composition of claim 1, further comprising an antioxidant selected from the group consisting of organophosphites; alkylated monophenols, polyphenols and alkylated reaction products of polyphenols with dienes; and esters of thioalkyl or thioaryl compounds.

25. A thermoplastic composition, comprising:
    about 30 to about 50 weight percent poly(arylene ether) comprising repeating 2,6-dimethylphenoxy units;
    about 30 to about 50 weight percent nylon-6,6;
    about 2 to about 8 weight percent poly(butylene terephthalate) ionomer comprising about 0.5 to about 1.0 mole percent of sodium 5-sulfoisophthalate units, where the mole percent is based on the total of terephthalate and sulfo-isophthalate units;
    about 5 to about 12 weight percent of an impact modifier selected from the group consisting of polystyrene-poly(ethylene butylene)-polystyrene block copolymers and polystyrene-poly(ethylene propylene) block copolymers;
    about 0.3 to about 1.5 weight percent citric acid or fumaric acid; and
    about 0.2 to about 2 weight percent carbon fibers having diameters of about 3.5 to about 500 nanometers;
    wherein all weight percentages are based on the weight of the total composition; and wherein the composition has a volume resistivity after molding of about $1 \times 10^3$ to about $1 \times 10^4$ Ohm-centimeter.

26. A thermoplastic composition, consisting essentially of:
    about 5 to about 95 weight percent of a poly(arylene ether);
    about 5 to about 95 weight percent of a polyamide;
    about 0.01 to about 10 weight percent of a compatibilizing agent; and
    about 0.1 to about 20 weight percent of a polyester ionomer which is the polycondensation product of (1) an aromatic dicarboxylic acid or its ester-forming derivative; (2) a diol compound or its ester-forming derivative; and (3) an ester-forming compound containing an ionic sulfonate group;
    up to about 20 weight percent of an impact modifier; and
    an amount of conductive filler effective to produce a volume resistivity after molding not greater than about $1 \times 10^5$ Ohm-centimeter;
    wherein weight percentages are based on the total weight of the composition.

27. A thermoplastic composition, comprising the reaction product of:
    about 5 to about 95 weight percent of a poly(arylene ether);
    about 5 to about 95 weight percent of a polyamide;
    about 0.01 to about 10 weight percent of a compatibilizing agent; and
    about 0.1 to about 20 weight percent of a polyester ionomer which is the polycondensation product of (1) an aromatic dicarboxylic acid or its ester-forming derivative; (2) a diol compound or its ester-forming derivative; and (3) an ester-forming compound containing an ionic sulfonate group;
    wherein weight percentages are based on the total weight of the composition.

28. A method for making a thermoplastic composition, comprising:
    blending about 5 to about 95 weight percent of a poly(arylene ether) and about 0.01 to about 10 weight percent of a compatibilizing agent to form a first intimate blend;
    blending the first intimate blend with about 5 to about 95 weight percent of a polyamide to form a second intimate blend; and
    blending the second intimate blend with about 0.1 to about 20 weight percent of a polyester ionomer which is the polycondensation product of (1) an aromatic dicarboxylic acid or its ester-forming derivative; (2) a diol compound or its ester-forming derivative; and (3) an ester-forming compound containing an ionic sulfonate group to form a third intimate blend;
    wherein weight percentages are based on the total weight of the composition.

29. A method for making a thermoplastic composition, comprising:
    blending about 5 to about 93 weight percent poly(arylene ether) and about 0.01 to about 10 weight percent compatibilizing agent to form a first intimate blend;
    blending the first intimate blend with about 5 to about 93 weight percent polyamide and about 2 to about 30 weight percent of a carbon fiber masterbatch, the masterbatch comprising about 0.01 to about 0.40 weight fraction carbon fibers and about 0.60 to about 0.99 weight fraction polyamide, to form a second intimate blend; and
    blending the second intimate blend with about 0.1 to about 20 weight percent of a polyester ionomer which is the polycondensation product of (1) an aromatic dicarboxylic acid or its ester-forming derivative; (2) a diol compound or its ester-forming derivative; and (3) an ester-forming compound containing an ionic sulfonate group to form a third intimate blend;
    wherein weight percentages are based on the total weight of the composition.

30. A molded article comprising the composition of claim 1.

31. The molded article of claim 30, further comprising a painted surface.

32. A molded automobile part comprising the composition of claim 1.

* * * * *